2,948,712

OLEFIN POLYMERIZATION CATALYST CONTAINING ALUMINUM, TITANIUM TETRAHALIDE, AND TITANIUM ALCOHOLATE

Harry W. Coover, Jr., Kingsport, Tenn., assignor to Eastman Kodak Company, Rochester, N.Y., a corporation of New Jersey No Drawing. Filed Apr. 3, 1958, Ser. No. 726,037

14 Claims. (Cl. 260—93.7)

This invention relates to a new and improved polymerization process and is particularly concerned with the use of a novel catalyst combination for preparing high molecular weight solid polyolefins, such as polypropylene, of high density and crystallinity. In a particular aspect the invention is concerned with the preparation of polypropylene and higher polyolefins having a high crystallinity and a high density using a particular catalyst combination which has unexpected catalytic activity.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combination often lead to liquid polymers rather than the desired solid polymers.

In my copending application Serial No. 559,536, filed January 17, 1956, of which this application is a continuation-in-part, there is described the polymerization of α-monoolefins to produce dense, highly crystalline polymers by heating said monoolefins in the presence of a mixture of aluminum and a titanium tetrahalide. Also in my copending application Serial No. 711,139, filed January 27, 1958, which is also a continuation-in-part of application Serial No. 559,536, there is described the polymerization of α-monolefins to form dense crystalline polymers by polymerizing said monoolefins in the presence of a catalyst formed by heating a mixture of aluminum and a titanium tetrahalide in the absence of a polymerizable hydrocarbon. This latter catalyst can be termed a preactivated catalyst and the former catalyst can be termed an unactivated catalyst. The preactivated catalyst has been found to produce unexpectedly superior results when compared with the unactivated catalyst. Both the unactivated and the preactivated catalysts are particularly useful for polymerizing ethylene to form dense crystalline polymers, but these catalysts can also be used for polymerizing propylene and higher α-monoolefins to form dense crystalline polymers. However, when the unactivated and preactivated catalysts are used to polymerize propylene and higher α-monoolefins it has been found that the polymeric product contains substantial amounts of relatively low molecular weight polymers which are either greases, oils or rubbery products. Obviously, when a high molecular weight, dense crystalline product is desired, these relatively low molecular weight polymers are undesirable, and it is one of the purposes of this invention to polymerize propylene and higher α-monoolefins in the presence of an improved catalytic mixture wherein the formation of relatively low molecular weight polymers is substantially and unexpectedly reduced.

It is an object of this invention to provide a novel and improved process for polymerizing propylene and higher α-monoolefins and in doing so to overcome disadvantages of earlier procedures. It is a particular object of this invention to provide a novel and improved process for polymerizing propylene in the presence of an improved catalyst composition containing aluminum and a titanium tetrahalide. As a result of the use of this improved catalyst composition unexpectedly improved yields of solid, dense, crystalline polymer are obtained without the concomitant formation of substantial amounts of lower molecular weight polymer. Other objects of this invention will be apparent from the description and claims which follow.

The above and other objects are attained by means of this invention, wherein α-monoolefins, either singly or in admixture, are readily polymerized to high molecular weight solid polymers by effecting the polymerization in the presence of an unactivated or a preactivated aluminum-titanium tetrahalide catalyst composition containing a titanium alcoholate, said alcoholate being selected from the group consisting of phenoxide and alkoxides wherein the alkoxide radicals contain from 1 to 12, preferably 1 to 4, carbon atoms. The significantly improved yields of the crystalline polymers produced with the above catalyst were completely unexpected.

The inventive process can be carried out in liquid phase in an inert organic liquid and preferably an inert liquid hydrocarbon vehicle, but in some instances the process is operated without a solvent. The process proceeds with excellent results over a temperature range of from 20° C. to 200° C. although it is preferred to operate within the range of from about 55° C. to about 150° C. Likewise, the reaction pressures may be varied widely from about atmospheric pressure to very high pressures of the order of 20,000 p.s.i. or higher. A particular advantage of the invention is that pressures of the order of 30–1000 p.s.i. give excellent results, and it is not necessary to employ the extremely high pressures which were necessary heretofore. The liquid vehicle employed is desirably one which serves as an inert liquid reaction medium.

The invention is of particular importance in the preparation of highly crystalline polypropylene although it can be used for polymerizing mixtures of ethylene and propylene as well as other α-monoolefins containing up to 10 carbon atoms. The results obtained by polymerizing the various olefins are quite unexpected. The crystallinity of the polymer as well as the average molecular weight of the product are substantially and unexpectedly improved. The high molecular weight, high density polymers of this invention are insoluble in solvents at ordinary temperatures but are partially soluble in such solvents as xylene, toluene or tetralin at elevated temperatures. These solubility characteristics make it possible to carry out the polymerization process under conditions wherein the polymer formed is soluble in the reaction medium during the polymerization and can be precipitated therefrom by lowering the temperature of the resulting mixture. The polypropylene produced by practicing this invention has a softening point above 155° C. and a density of 0.91 and higher. Usually the density of the polypropylene is of the order of 0.91 to 0.92.

The polypropylene and other polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polypropylene obtained according to this process. Other poly-α-olefins as well as copolymers of ethylene and propylene can also be prepared in accordance with this invention.

As has been indicated above the improved results obtained in accordance with this invention depend upon the particular catalyst combination. Thus, one of the components of the catalyst is aluminum and another component is a titanium tetrahalide wherein the halogen is selected from the group consisting of chlorine, bromine and iodine. The third component of the catalyst composition is a titanium alcoholate which is either a phenoxide or an alkoxide wherein the alkoxyl radicals contain 1 to 12 carbon atoms. Alkoxides containing 1 to 4 carbon atoms are preferred, for example, methoxide, ethoxide, propoxide, butoxide, and the like. In the alcoholates the titanium can be at its maximum valence or at a reduced valence. Thus, the di-, tri-, and tetra-alcoholates of titanium can be used in practicing this invention.

The limiting factor in the temperature of the process appears to be the decomposition temperature of the catalyst. Ordinarily temperatures from 55° C. to 150° C. are employed, although temperatures as low as 20° C. or as high as 200° C. can be employed if desired. Usually, it is not desirable or economical to effect the polymerization at temperatures below 20° C., and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses. The catalyst mixture is readily soluble in the usual organic liquid vehicles and hence the uniformity of reaction can be readily controlled.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymer of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight or preferably from about 2 to about 10% by weight based on the weight of the vehicle. Concentrations of monomer in the vehicle of about 3–7% by weight are commonly employed. Higher concentrations of monomer ordinarily increase the rate of polymerization, but concentrations above 5–10% by weight are ordinarily less desirable because the polymer dissolved in the reaction medium results in a very viscous solution.

The titanium tetrahalide in the catalyst is usually employed in an amount of from 0.1 to 45 parts by weight per part of aluminum metal, and weight ratios of titanium tetrahalide to alcoholate within the range of 1:0.5 to 1:2 are preferred. However, it will be understood that ratios outside these ranges can be used in practicing this invention. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variations, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-octane, iso-octane, methyl cyclohexane, and any of the other well-known inert liquid hydrocarbons.

The polymerization ordinarily is accomplished by merely admixing the components of the polymerization mixture which is then adjusted to the reaction temperature. The more elevated temperatures can be used to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

A particularly effective catalyst for polymerizing propylene and other α-monoolefins in accordance with this invention is a mixture of aluminum, titanium tetrachloride and titanium tetrabutoxide. The importance of the tetrabutoxide in this reaction mixture is evident from the fact that the presence of the tetrabutoxide makes possible the production of polymers of substantially improved properties.

The aluminum and titanium tetrahalide that are employed in the catalytic mixture of this invention can be in either the unactivated or the preactivated form. When the unactivated form is employed the aluminum and titanium tetrahalide as well as the third component of the catalyst are added to the polymerization reaction mixture, and in most instances it is usually necessary to undergo an induction period before the monomer in the reaction mixture is actually polymerized to the desired product. Preferably the aluminum and titanium tetrahalide are employed in a preactivated form. For preactivation of the catalyst a mixture of aluminum and titanium tetrahalide are heated for a period of time varying from about one hour to substantially longer periods of time in the absence of polymerizable monomer, such as ethylene, propylene and higher monoolefins. Temperatures of 50° C. up to about 300° C. are usually sufficient for the preactivation, and contact times varying from 5 minutes to 48 hours can be used. Suitable procedures for preparing preactivated mixtures of aluminum and titanium tetrahalide are described in my copending applications Serial No. 559,536 and Serial No. 711,139. The catalytic mixture that is formed as a result of the preactivation of aluminum and titanium tetrahalide has been found to contain aluminum trihalide and titanium trihalide in addition to aluminum and titanium tetrahalide. This mixture along with the alcoholates of the catalyst described above is outstandingly effective for polymerizing propylene and higher monoolefins while at the same time reducing substantially the amount of low molecular weight polymers formed during the reaction. The aluminum that is employed in the catalyst mixture is preferably in flake or finely-divided form for optimum activity, rapid polymerization and high yield of polymer but actually any form of aluminum metal can be used in the process. When a granular aluminum of commerce is used it is desirable to clean the surface of the granules with an acid or acid mixtures such as a mixture of nitric and hydrofluoric acids or with a base for optimum results. However, the cleaning of the aluminum is not absolutely essential to the invention. Titanium tetrachloride is the preferred titanium tetrahalide although titanium tetrabromide as well as titanium teraiodide can be used.

The diluents employed in practicing this invention can be advantageously purified prior to use in the polymerization re action by contacting the diluent, for example, in a distillation procedure or otherwise, with the polymerization catalyst to remove undesirable trace impurities. Also, prior to such purification of the diluent the catalyst can be contacted advantageously with a polymerizable α-monoolefin.

Thus, by means of this invention polyolefins such as polypropylene, the polybutenes, polystyrene, and the like are readily produced using a catalyst combination which, based on the knowledge of the art, would not be expected to produce the results obtained. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, aside from the relatively higher values for such properties as softening point, density, stiffness and the like, the polymers embodying this invention can be treated in similar manner to those obtained by other processes.

From the detailed disclosure of this invention it is quite apparent that in this polymerization procedure a novel catalyst, not suggested in prior art polymerization procedures, is employed. As a result of the use of this novel catalyst it is possible to produce polymeric hydrocarbons, particularly polypropylene, having properties not heretofore obtainable. For example, polypropylene prepared in the presence of catalyst combinations within the scope of this invention is substantially free of rubbery and oily polymers and thus it is not necessary to subject such polypropylene of this invention to extraction procedures in order to obtain a commercial product. Also polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to polypropylene prepared in accordance with this invention thus characterize and distinguish this polyproplyene from polymers prepared by prior art polymerization procedures.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example, by washing with water or lower aliphatic alcohols such as methanol.

The catalyst compositions have been described above as being effective primarily for the polymerization of α-monoolefins. These catalyst compositions can, however, be used for polymerizing other α-olefins, and it is not necessary to limit the process of the invention to monoolefins. Other α-olefins that can be used are butadiene, isoprene, 1,3-pentadiene and the like.

The following examples are illustrative of this invention.

*Example 1*

A clean, dry, 300-ml. stainless steel autoclave was placed in a nitrogen-filled dry box and charged with 0.5 g. of aluminum, 3.5 g. of titanium tetrachloride and 1.8 g. of titanium tetrabutoxide. The autoclave was sealed and placed in a rocker. Liquid propylene, 100 ml. (51 g.), was added and the temperature was raised to 90° C. The autoclave was rocked under these conditions for 8 hr. At the end of the 8 hr. the autoclave was cooled and vented. The product was treated with sodium hydroxide solution to remove aluminum, then with ethanol and with water. The yield of polypropylene was 41 g. from which, after extraction with dibutyl ether and heptane, 32 g. of highly crystalline polypropylene (density 0.919, inherent viscocity 2.23) was obtained.

*Example 2*

The procedure of Example 1 was repeated except that the propylene was polymerized at 55° C. for 24 hr. The product was 34 g. of polymer which upon extraction with dibutyl ether and heptane left a residue of 25 g. of highly crystalline polypropylene having an inherent viscosity of 2.51 and a density of 0.918.

*Example 3*

The procedure of Example 1 was repeated except that the monomer was 100 ml. of liquid 1-butene. The product was 33 g. of a polymer from which 17 g. of a highly crystalline poly-1-butene was obtained by extraction.

*Example 4*

The procedure of Example 1 was repeated at 150° C. with 100 ml. of 3-methyl-1-butene as the monomer. The yield was 30 g. of polymer which contained 17 g. of a highly crystalline poly-3-methyl-1-butene after extraction.

Example 5

The procedure of Example 1 was repeated except that 100 ml. of 4-methyl-1-pentene was used instead of propylene. The temperature was 125° C. The product was 37 g. of polymer which gave upon extraction 24 g. of a highly crystalline poly-4-methyl-1-pentene.

Example 6

The procedure of Example 1 was repeated except that the catalyst was made up of 0.1 g. of aluminum, 1.5 g. of titanium tetrachloride and 1.5 g. of titanium tributoxide. The product was 19 g. of polymer from which 16 g. of highly crystalline polypropylene was obtained by extraction.

Example 7

The procedure of Example 1 was repeated except that the titanium tributoxide was replaced by 3 g. of titanium tetraphenoxide and the temperature was 85° C. The product was 33 g. of polymer which upon extraction gave 23 g. of highly crystalline polypropylene which had a density of 0.918 and an inherent viscosity of 2.37.

Example 8

A 500-ml. pressure bottle was charged with 0.5 g. of aluminum, 3.5 g. titanium tetrachloride, 3.5 g. of titanium tetraisopropoxide and 100 ml. of heptane. The bottle was connected to a reservoir which maintained at 30 p.s.i.g. propylene pressure. The temperature was raised to 70° C. and the bottle and contents were shaken for 6 hours. At the end of this period the bottle was opened and the contents were removed. The product which was isolated as in Example 1 was 17 g. of polypropylene. Extraction of this product gave 13 g. of a highly crystalline polypropylene.

Example 9

The procedure of Example 8 was repeated except that the titanium tetrachloride was 1.8 g., the pressure was 0 p.s.i.g. (15 p.s.i.a.), and the duration of the run was 24 hrs. The yield was 12 g. of polymer from which 10 g. of highly crystalline polymer was obtained by extraction.

Example 10

The procedure of Example 8 was repeated to obtain increased yields of polymer using as monomers styrene, allyl benzene, vinyl cyclohexane and fluorostyrene.

Example 11

Elimination of alcoholates from the catalysts in the above examples results in the production of large amounts of oily, low molecular weight polymers and low yield (1 to 5 grams) of solid crystalline polymers. The procedure of Example 8 was followed omitting entirely the titanium tetraisopropoxide. After 6 hours at 70° C. the liquid contents of the pressure bottle were greatly increased. Analysis of the 113 g. of liquid product by means of gas chromatography showed it to be dimers, trimers, and tetramers of propylene. The boiling points of the products confirmed this. Only one gram of solid polypropylene was formed.

I claim:

1. In the polymerization of α-monoolefinic hydrocarbons containing from 3–10 carbon atoms to form solid crystalline polymer, the improvement which comprises catalyzing the polymerization with a catalytic mixture consisting essentially of aluminum and a titanium tetrahalide selected from the group consisting of tetrachloride, tetrabromide and tetraiodide in a weight ratio of 1:1.5 to 1:7 and a weight ratio of titanium tetrahalide and a titanium alcoholate selected from the group consisting of phenoxides and alkoxides wherein the alkoxide radicals contain from 1–4 carbon atoms within the range of 1:0.5 to 1:2.

2. In the polymerization of propylene to form solid, crystalline polymer, the improvement which comprises effecting the polymerization in liquid dispersion in an inert, organic hydrocarbon solvent and in the presence of a catalytic mixture consisting essentially of an activated aluminum-titanium tetrahalide selected from the group consisting of tetrachloride, tetrabromide and tetraiodide in a weight ratio of 1:1.5 to 1:7 and a weight ratio of titanium tetrahalide and a titanium alkoxide wherein the alkoxide radicals contain from 1–4 carbon atoms within the range of 1:0.5 to 1:2.

3. In the polymerization of propylene to form solid, crystalline polymer, the improvement which comprises effecting the polymerization in liquid dispersion in an inert, organic hydrocarbon solvent and in the presence of a catalytic mixture consisting essentially of an activated aluminum-titanium tetrachloride in a weight ratio of 1:1.5 to 1:7 and a weight ratio of titanium tetrachloride to titanium tetraalkoxide wherein the alkoxide radicals contain from 1–4 carbon atoms within the range of 1:0.5 to 1:2.

4. In the polymerization of propylene to form solid, crystalline polymer, the improvement which comprises effecting the polymerization in liquid dispersion in an inert, organic hydrocarbon solvent and in the presence of a catalytic mixture consisting essentially of activated aluminum-titanium tetrachloride in a weight ratio of 1:1.5 to 1:7 and a weight ratio of titanium tetrachloride and titanium tetrabutoxide within the range of 1:0.5 to 1:2.

5. The method according to claim 4 wherein titanium tetrabutoxide is replaced by titanium tributoxide.

6. In the polymerization of propylene to form solid, crystalline polymer, the improvement which comprises effecting the polymerization in liquid dispersion in an inert, organic hydrocarbon solvent and in the presence of a catalytic mixture consisting essentially of activated aluminum-titanium tetrachloride in a weight ratio of 1:1.5 to 1:7 and a weight ratio of titanium tetrachloride and titanium tetraisopropoxide within the range of 1:0.5 to 1:2.

7. The method according to claim 6 wherein titanium tetraisopropoxide is replaced by titanium tetraphenoxide.

8. As a composition of matter, a polymerization catalyst consisting essentially of aluminum and a titanium tetrahalide selected from the group consisting of tetrachloride, tetrabromide and tetraiodide in a weight ratio of 1:1.5 to 1:7 and a weight ratio of a titanium alcoholate selected from the group consisting of phenoxides and alkoxides wherein the alkoxide radicals contain from 1–4 carbon atoms within the range of 1:0.5 to 1:2.

9. As a composition of matter, a polymerization catalyst consisting essentially of an activated aluminum-titanium tetrahalide selected from the group consisting of tetrachloride, tetrabromide and tetraiodide in a weight ratio of 1:1.5 to 1:7 and a weight ratio of a titanium alkoxide wherein the alkoxide radicals contain from 1–4 carbon atoms within the range of 1:0.5 to 1:2.

10. As a composition of matter, a polymerization catalyst consisting essentially of activated aluminum-titanium tetrachloride in a weight ratio of 1:1.5 to 1:7 and a weight ratio of titanium tetrachloride and a titanium tetraalkoxide wherein the alkoxide radicals contain from 1–4 carbon atoms within the range of 1:0.5 to 1:2.

11. As a composition of matter, a polymerization catalyst consisting essentially of activated aluminum-titanium tetrachloride in a weight ratio of 1:1.5 to 1:7 and a weight ratio of titanium tetrachloride and titanium tetrabutoxide within the range of 1:0.5 to 1:2.

12. As a composition of matter, a polymerization catalyst consisting essentially of activated aluminum-titanium tetrachloride in a weight ratio of 1:1.5 to 1:7 and a weight ratio of titanium tetrachloride and titanium tributoxide within the range of 1:0.5 to 1:2.

13. As a composition of matter, a polymerization catalyst consisting essentially of activated aluminum-titanium tetrachloride in a weight ratio of 1:1.5 to 1:7 and a weight ratio of titanium tetrachloride and titanium tetraisopropoxide within the range of 1:0.5 to 1:2.

14. As a composition of matter, a polymerization catalyst consisting essentially of activated aluminum-titanium tetrachloride in a weight ratio of 1:1.5 to 1:7 and a weight ratio of titanium tetrachloride and titanium tetraphenoxide within the range of 1:0.5 to 1:2.

References Cited in the file of this patent

UNITED STATES PATENTS

| | | |
|---|---|---|
| 2,833,755 | Coover | May 6, 1958 |
| 2,845,412 | Heyson | July 29, 1958 |

FOREIGN PATENTS

| | | |
|---|---|---|
| 1,132,506 | France | Nov. 5, 1956 |
| 1,144,710 | France | Apr. 29, 1957 |
| 1,155,944 | France | Dec. 9, 1957 |
| 783,487 | Great Britain | Sept. 25, 1957 |